(12) United States Patent
Elmekies

(10) Patent No.: US 9,092,061 B2
(45) Date of Patent: Jul. 28, 2015

(54) AUGMENTED REALITY SYSTEM

(76) Inventor: David Elmekies, Brooklyn, NY (US)

(\*) Notice: Subject to any disclaimer, the term of this patent is extended or adjusted under 35 U.S.C. 154(b) by 263 days.

(21) Appl. No.: 13/345,069

(22) Filed: Jan. 6, 2012

(65) Prior Publication Data

US 2012/0176516 A1 Jul. 12, 2012

Related U.S. Application Data

(60) Provisional application No. 61/430,319, filed on Jan. 6, 2011.

(51) Int. Cl.
*G06F 3/01* (2006.01)
*G06T 19/00* (2011.01)
*H04N 5/265* (2006.01)

(52) U.S. Cl.
CPC ............... *G06F 3/017* (2013.01); *G06F 3/011* (2013.01); *G06T 19/006* (2013.01); *H04N 5/265* (2013.01); *G06T 2200/04* (2013.01)

(58) Field of Classification Search
CPC ........ H04N 5/265; H04N 5/262; G06F 3/011; G06F 3/017; G06T 19/006
USPC ........................................................ 348/239
See application file for complete search history.

(56) References Cited

U.S. PATENT DOCUMENTS

| | | | | |
|---|---|---|---|---|
| 8,400,548 | B2 * | 3/2013 | Bilbrey et al. | 348/333.01 |
| 2003/0184594 | A1 * | 10/2003 | Ellenby et al. | 345/810 |
| 2004/0131232 | A1 | 7/2004 | Meisner et al. | |
| 2006/0190812 | A1 * | 8/2006 | Ellenby et al. | 715/512 |
| 2007/0162942 | A1 * | 7/2007 | Hamynen et al. | 725/105 |
| 2009/0232354 | A1 * | 9/2009 | Camp et al. | 382/103 |
| 2010/0066750 | A1 * | 3/2010 | Yu et al. | 345/581 |
| 2010/0122286 | A1 * | 5/2010 | Begeja et al. | 725/34 |
| 2010/0164989 | A1 * | 7/2010 | Margalit et al. | 345/629 |
| 2010/0220891 | A1 | 9/2010 | Lefevre et al. | |
| 2010/0257252 | A1 * | 10/2010 | Dougherty et al. | 709/217 |
| 2011/0161076 | A1 * | 6/2011 | Davis et al. | 704/231 |
| 2013/0305153 | A1 * | 11/2013 | Schwarz | 715/716 |

FOREIGN PATENT DOCUMENTS

JP 1165814 3/1999

OTHER PUBLICATIONS

International Searching Authority (ASA), Patent Cooperation Treaty (PCT) International Preliminary Report on Patentability, May 31, 2012.

\* cited by examiner

*Primary Examiner* — James Hannett
(74) *Attorney, Agent, or Firm* — Gottlieb, Rackman & Reisman, PC (57) ABSTRACT

The present invention is directed to a video display and user control for the video display. In the preferred embodiment, multiple video feeds are combined into a single video display, where one feed, preferably live, includes an encoded marker which is used by a computer to select a second and display a second feed, wherein the location and orientation of the second feed changes based on the location and orientation of the encoded marker in the first feed. At least a portion of the display gives the appearance of depth, such as through use of superimposed animation. The live image is controlled by the user's movement, causing at least a part of the display to move in concert with the user's motion, thereby creating an enhanced three dimensional effect for a superimposed display.

10 Claims, 5 Drawing Sheets

AUGMENTED REALITY SYSTEM

This application claims priority to U.S. Provisional Patent Application No. 61/430,319, filed on Jan. 6, 2011 and incorporated herein by reference.

BACKGROUND OF THE PRESENT INVENTION

The content of a movie or a video is usually intended to educate or entertain. For generations, users who watch movies or other video have had limited or no control of the content of the display unless the video is self produced, in which the content of the video is limited to what is shot by the user. At times, a movie or video includes animation art, and the opportunity to control such art for educational or entertainment purposes has long been desired. Further, until recently, animation art and video photography were only passively viewed by users, without control to integrate live action with animation in the same display, and particularly not in real time. Recent video games have given users some control over a display, such as when a user controls a joy stick to control an on-screen avatar, but that control is not over a live event and is limited to not include an actual live feed or camera angles, and there is no consequential changes to a second feed based on changes in a live feed, nor does the user have the ability to rotate or position animation in the display.

Also, at least until recently, users have had no ability to combine video feeds into a single display, where the content of the feeds is integrated and changes in one feed are automatically based on changes in another other. For example, users cannot cause their own movement to change the position of animation from a second feed, even though there has been a long-standing desire to do so, particularly when one of the feeds is a "live" feed from a video camera and the second feed is related to and superimposed upon the first feed.

Therefore, there is a need for a solution whereby a user may control both their own likeness or some other image in a live feed for a displaying a real time video, concurrently overlay a second video feed, and control at least a portion of the second feed by the user's own real time body movements, which only appear in the first feed. There is also a need to have a processing device recognize an encoded object in the live feed being shot by the camera and cause to display a corresponding video superimposed overlaying the live feed. In addition, there is a need for such a solution to be enhanced by allowing the superimposed image to move in concert with the user's own movement or movement of an object and/or to move in concert with a variety of other stimuli, such as music or voice command, or in concert with multiple such stimuli. There is also a need to make the superimposed image appear three dimensional (3D). There is also a need to make the superimposed image change based on other factors, such as but not limited to audible or keystroke input.

OVERVIEW OF THE PRESENT INVENTION

To overcome this problem, the present invention is directed to application of user control for a video display. In the preferred embodiment, at least a portion of the display of the present invention gives the appearance of depth, such as through use of superimposed animation, so that as the image is controlled by the user through the user's movement, the motion of the user causes at least a part of the display to rotate or move in concert with the motion of the user or an object in the display, thereby creating an enhanced three dimensional effect for a superimposed display, and giving the user the experience of a three dimensional image overlaying something in the user's hand.

The present invention is particularly suited for entertainment and educational purposes and the video of the present invention may be combined with audio for an enhanced user-controlled experience.

In its simplest form, the present invention combines two separate feeds, where the first preferably is "live" video obtained via a video camera such as but not limited to a webcam, and a second superimposed feed. In the preferred embodiment, the second feed is selected by a processor from within one or more libraries of such feeds based on the control of the live video, where the entries in the library are organized as digital data. These library entries each include information for showing the feed in a variety of orientations and allow for movement of the feed on-screen. This second feed moves based on movement within the shot being obtained by the video camera. For example, the first feed may include the user's hand holding an object, preferably a flash card. (The term "card" is being used herein to denote any such object with encoded information as described herein). The object has encoded information ("marker") within it which is recognized from a library by the camera in combination with the processor, and this encoded information is used to select the proper second feed and to properly place the second feed in the video screen. In the preferred embodiment, this second feed is placed so that it appears to be sitting on the object, thereby giving the appearance of a three dimensional (3D) avatar leaping from the screen.

As the user moves his or her hand, the user effectively controls the movement of the superimposed feed, both in terms of its orientation and size. In an alternative or in combination, movement of the superimposed feed may be based on changes in sound, where the sound originates from the user, the operating computer, or an external source. For example, the sound may be music or voice prompts. Movement may alternatively be based on keystrokes, mouse movements (or equivalent), multi-touch, or other physical interaction of a user with a computer. In yet another alternative, movement of the superimposed feed may be based on movement of a stylus, either alone or in combination with the alternatives discussed in this paragraph.

The present invention is further directed to methods and apparatus for visually presenting on-screen images in response to stimuli captured by a camera during a live feed and then presenting the camera-captured images in a coordinated fashion with a decoded feed based on the stimuli, which preferably are detected content in the live feed. The camera may be a webcam or any other type of known video camera which can produce real time video feeds. Preferably, the live feeds of the camera are "unprocessed" in that the image shot by the camera is not itself altered. The system of the present invention includes a computer with a video-capable camera and a display, such as a monitor, as well as an optional keyboard for entry and an audio player and speakers for playing audio, as well as one or more "flash cards", each of which depicts one or more encoded images. In the preferred embodiment, the computer has a memory which stores load files, however, such files could alternatively be stored remotely and loaded in RAM (or equivalent) on a demand basis.

When the present invention is implemented, in the preferred embodiment a user positions the camera in the direction of a card. The card has an image on its face. A coding is embedded in the card and preferably within the image observed by the camera. The coding may be based on any of several known coding techniques, and may be based on positional identification, color identification, some combination, or other known techniques. In one embodiment, the flash cards may be encoded in multiple ways so as to allow for decoding by a plurality of computer types. When the camera is positioned to see the card, an image of the card is captured by the camera and its encoding is identified and interpreted by a processor in a computer. The computer communicates with a display, causing the image obtained by the camera (including background) to be displayed and also superimposes a second image corresponding to the encoding in the card. That is, the processor understands the encoding and superimposes an image selected from memory, either local or remote, based on the decoded image on the card.

By decoding the image, the processor further recognizes the orientation of the card and the card's distance from the camera and delivers the superimposed image correspondingly. That is, the superimposed image is oriented based on the flash card's orientation relative to the camera, and the superimposed image's size is determined based on the distance the flash card is from the camera.

Further, the camera continually provides the processor with the image, even when the card moves or changes orientation, and the processor tracks the movement of the image in real time (and, by extension, the flash card's movement in real time). Because of this tracking and the control functionality of the processor, the second, superimposed image can be displayed as stationary, have full motion capability, or both, and the movement can be made to be harmonious with the movement of the card.

In the preferred embodiment, the displayed image will include the user's hand holding the card, and the superimposed image can appear to be resting on or rising from the card. In the preferred embodiment, the superimposed image will be a full motion image that moves or rotates fully in concert with the flash card's motion and rotation, and the changes can be seen by the user as occurring in real time. In another embodiment, for example, the image can show a stationary field (potentially corresponding to the user's hand and the surface of the card), with another image, such as that of an animal is walking or partaking in another activity. This superimposed moving image enhances the 3D effect and provides the user with the appearance of a three dimensional image in that portions appear to move in three dimensions.

In the preferred embodiment, no glasses are needed for the 3D effect, although glasses may be used or required in alternative embodiments.

In an alternative embodiment, the processor can further play audio, such as music, and the superimposed image, in part or in whole, can move in unison with or associated with the audio. In yet another embodiment, music or other audio can be played external to the computer and the computer can recognize the music and move the superimposed image accordingly. In another embodiment, the present invention can concurrently deliver audio or additional video, such as by introducing a question to the user. The user may respond in a variety of known ways, causing the processor to change the superimposed image in part or in total.

The user can retain significant control over the display simply by rotating or otherwise moving the card. As the user rotates or moves the card, the processor can assure that the superimposed image correspondingly rotates or moves in unison with the card's movement. Alternatively, only a portion of the superimposed image may move in unison with the card's movement. That is, one portion of the superimposed image may appear to remain fixed in position while another portion (for example, that of an animal) may move relative to the fixed portion.

In addition to the superimposed second image, the computer may play audio, and the audio may describe the image or provide guidance for the user, such as providing questions for quizzes or instructions to introduce enhancements to or alternatives to the initial superimposed image.

In the preferred embodiment, the superimposed images are artistic representations, thereby improving the three dimensional appearance over ordinary photography. In other embodiments, the representations may be developed from three dimensional photography.

In another embodiment, the combined images and their movement, together with audio, may be recorded for later playback.

The present invention is preferably used with a traditional personal computer (PC) which includes a camera, a processor, a video display, as well as memory or access to memory. Because the superimposed image is an overlay of another display and because it may include full motion video, the present invention is particularly applicable to education purposes and gaming purposes as well as other purposes.

The present invention is not limited to a traditional PC computer, but alternatively may be used with Apple-devices, Xboxes and other game consoles, as well as various mobile devices that have a camera, a display, a processor, and either memory or internet access.

In the preferred embodiment, the user is a child who uses simple Flash Cards (See FIG. 1) and a webcam, which facilitates learning come to life by launching Live 3D animated worlds. A child can rotate this living and animated world in real time—by simply rotating the Flash Cards—allowing them to discover new perspectives, hear real-life sounds, and learn new facts that supplement the content of books. The server software can either be downloaded to the user's computer and used in the present invention or can be run remotely by connecting the computer to the internet, for example, through exchange of data originating from a video camera, preferably a webcam.

This video cam data is analyzed largely using a library, such as FLAR Toolkit, which is incorporated into the software of the server on the engine of the present invention. The toolkit libraries are used to analyze camera data to determine if an Augment Reality ("augmented reality" or "AR") marker is present. This AR marker is an encoding embedded onto an object or page and is recognizable in the present invention. When the marker is placed before a video camera in the present invention, the software of the present invention recognizes the marker and its position and scale. The processor of the present invention, in combination with the libraries of the present invention, pass back position and scale data about the AR marker which is used to place 3D objects into the display, composited appropriately above the webcam data. This composted scene is displayed to the user in real time, creating the illusion of "augmented reality".

DETAILED DESCRIPTION OF THE PRESENT INVENTION

The present invention includes a software platform for delivering the combined feeds described above as well as a development environment for introducing combined feeds. The software platform includes an authoring environment for content production, a high performance engine for establishing the 3D-like overlay displays, and one or more code libraries for displaying the augmented reality displays. In the preferred embodiment, the following software is used, respectively, for each of the three areas described and to create the AR experience—Flash CS5, Paper Vision, and FLAR Toolkit. Equivalents may be used in alternative embodiments. The AR experience is compiled to a standard Abode .swf file. This file is placed on a webserver or a local computer within a standard html wrapper.

The user views the experience by, effectively, navigating to the html page. The user must have Flash Player 10.1 installed on their system, or equivalent, to view the .swf file wrapped in the html page. In the preferred embodiment, by utilizing Flash Player 10.1, Papervision3D, and the FLARToolKit, augmented reality experiences are created in which learning comes to life.

Although a variety of computer systems may be used for the present invention, the preferred computer system is a PC-based system with an Intel Core Duo Processor 2.4 Ghz or higher, 1024×768 display capability (video card+monitor), 1 GB RAM or above, and a webcam.

One module which is a part of the present invention is an Automatic Threshold Adjustment System, which is a very powerful system to increase the reliability of FLARToolkit (or equivalent) under a variety of conditions. This system compensates for different lighting conditions and glare on end-users computer systems. By dynamically altering the threshold during AR playback, when the position marker is often lost, the present invention allows for a much more robust tracking system. And because the present system does not do any additional processing on the captured images, it is also very fast.

In the preferred embodiment, three different proprietary techniques are used to improve tracking stability and perceived stability in the present invention, although in alternate embodiments fewer than all three may be used. Again, these enhancements are independent of the specific AR Tracking Toolkit used.
1. Detection smoothing removes quick variations in marker detection by waiting a fixed number of frames after detection is lost before propagating a detection lost event to the system. If detection is regained within this time period, a detection lost event is never sent.
2. Realtime 3D positional smoothing averages the 3D position of an object over a given number of position data points, resulting in smoother 3D movement of objects in the scene.
3. Activity Level Threshold Monitoring is used to monitor the activity level of the camera. The position of the marker is only updated if the activity level is above a predetermined threshold.

Several different techniques may be used concurrently to improve tracker stability and perceived stability in the AR engine. Detection smoothing removes quick variations in marker detection by waiting a fixed number of frames after detection is lost before propagating a detection lost event to the AR engine. If detection is regained within this time period, a detection lost event is never sent. Positional smoothing averages the position of an object over a given sample size.

The activity level of the camera is monitored to identify an activity level (0-100) of the camera. In the preferred embodiment, the position of the marker is only updated if the activity level is above a predetermined threshold.

An XML-Based Animation System may be used to speed the development of simple AR projects containing one model and associated animation and sound.

Figure 1:
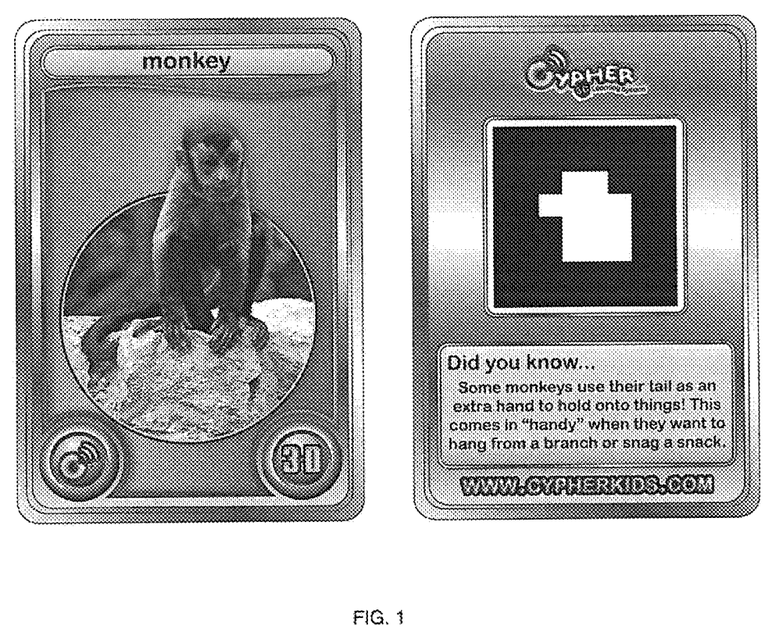
FIG. 1 provides an example of a Cypher 3D Interactive Card.
Figure 2:
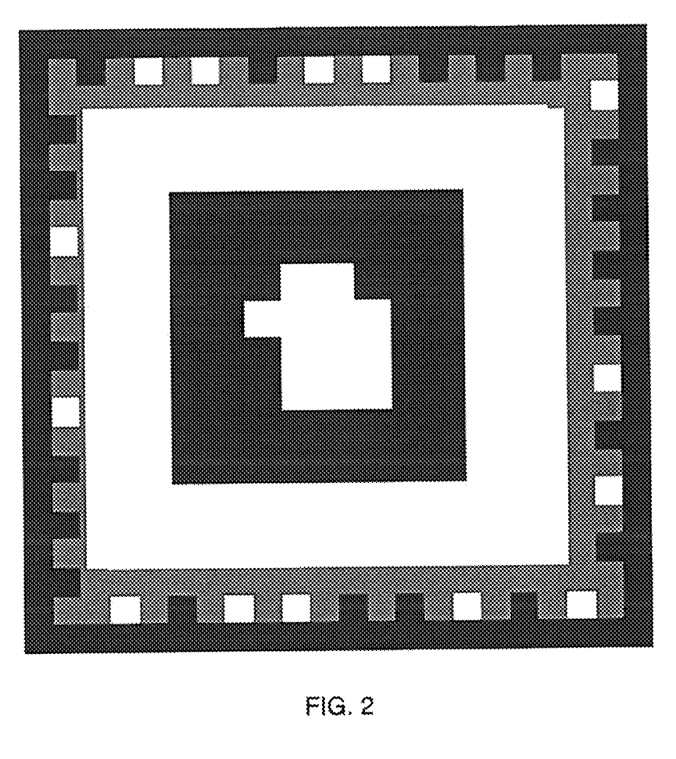
FIG. 2 provides an example of a Cypher Marker.

In addition to providing for a combined display as described herein, the present invention also includes a development engine and development environment. The system is specifically designed for the rapid implementation of new animations, such as those associated with CypherKids™ Flash Cards from Cypher Entertainment Group of New York, N.Y. An example of one such flash card is shown in FIG. 1. The Flash Card includes a marker, and the detail of the marker is shown in FIG. 2.

Figure 3A:
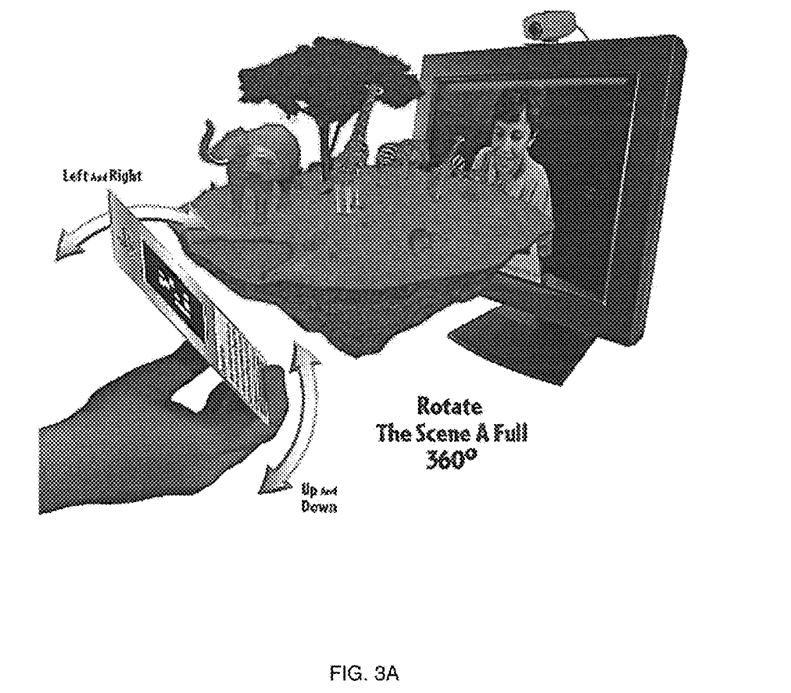
FIG. 3A provides an example of a child using the Cypher 3D Interactive Card with a PC-based device.
Figure 3B:
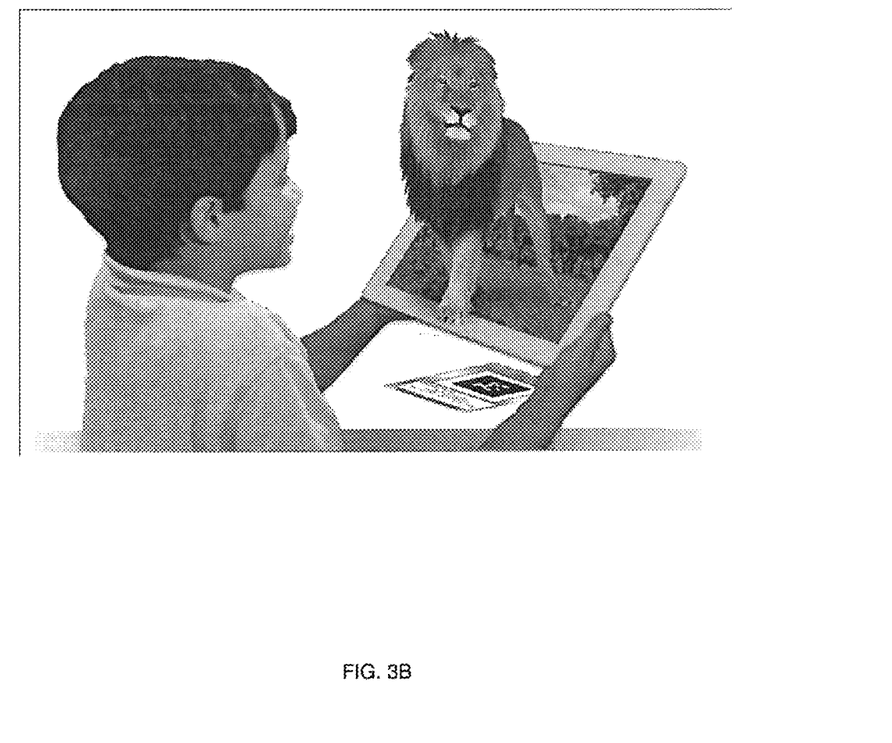
FIG. 3B provides an example of a child using the Cypher 3D Interactive Card with a tablet device, specifically an iPad.

Examples of the combined display are shown in FIG. 3A and FIG. 3B, where a web camera is observing a child-user holding a flash card, and a superimposed second feed appears to be emerging from the display (a PC-based display in the example of FIG. 3A, and a tablet-based display, specifically an iPad, in the example of FIG. 3B, and is aligned with the flash card's image on the display.

The XML Animation System consists of two parts—an Augmented Reality Flash Engine and an XML Descriptor File. The Augmented Reality Flash Engine reads an XML Descriptor file, and based on the content of the file, renders the AR scene appropriately. The XML Descriptor File specifies the location of the assets needed for the scene and the trigger sequences for animation and sound. By filling out the information in the XML Descriptor File, artists can more easily create simple AR scenes without programmer intervention.

The present invention includes an authoring system to allow users to write a single code base which can easy be ported to a device such as but not limited to a PC. In the preferred embodiment, a game engine software development environment from Unity (associated with the Georgia Tech College of Computing Research) is used. The Unity AR Toolkit includes a set of plugins for the Unity Game Engine that allows users to easily develop and deploy AR applications. The toolkit consists of three plugins with limited interdependence; VideoWrapper, TrackerWrapper and VRPNWrapper, all of which were created at the Georgia Tech College of Computing Research. These plugins facilitate video see-through tracking using either marker-based computer vision or external hardware such as GPS and orientation sensors. The VideoWrapper plugin provides a camera source selection widget along with scripts for grabbing camera frames and applying those textures (bitmap images applied to 3D surfaces) to elements in Unity. The TrackerWrapper plugin provides several scripts for attaching marker-based tracking elements directly to elements in Unity products. The VRPNWrapper plugin provides scripts that allow for the instantiation of server and client VRPN trackers, analogs and buttons.

The development environment of the present invention preferably includes computer vision technology to tightly align graphics with printed surfaces and simple 3D objects, and support for multiple development tools such as but not limited to Eclipse (Android™), Xcode, and Unity. The development environment of the present invention also includes support for image targets, frame markers, multi targets and virtual buttons.

The present invention also includes a software library, preferably ARToolKit or ARToolKitPlus, that is used to calculate camera position and orientation relative to physical markers in real time. This enables the easy development of a wide range of Augmented Reality applications. ARToolKit may also be used for building AR applications. These are applications that involve the overlay of virtual imagery on webcam video feeds.

The present invention further includes an Automatic Threshold Adjustment System (ATAS) so as to increase the reliability of any specific AR Tracking Toolkit used. The system compensates for different lighting conditions and glare on end-users computer systems. By dynamically altering the threshold of the video image sent to the specific AR Tracking Toolkit for processing when marker tracking is lost, the present invention compensates for poor lighting conditions and glare on a user's computer system. This inclusion creates a much more robust composite tracking system no matter which specific AR Tracking technology is implemented without introducing delay.

The present invention also includes an XML-based animation system, which is intended to speed the development of simple AR projects containing one model and associated animation and sound. The system is specifically designed for the rapid implementation of the flash cards used in the present invention.

The Augmented Reality Flash Engine reads an XML Descriptor file, and based on the contents of the file, renders the AR scene appropriately.

The XML Descriptor file specifies the location of the assets needed for the scene and the trigger sequences for animation and sound. By filling out the information in the XML Descriptor file, artists can more easily create simple AR scenes without programmer intervention.

The present invention may be used in mobile device as well. A mobile application is preferably downloaded by the user to their mobile device. The mobile application recognizes the Frame Marker on the product packaging and streams relevant information from the web to display over the Frame Marker. The information could be a video, text, or an additional scene or scenes. The information may contain audio, or could even be an interactive game or other interactive experience. The user's mobile device must have a back facing camera and be supported by our application. The AR experience is triggered when the user, running the mobile application, points the mobile device at the Frame Marker within 1 to 3 feet of the marker. The AR experience works best in good lighting conditions and when the Frame Marker is printed on non-glossy material.

Figure 4:
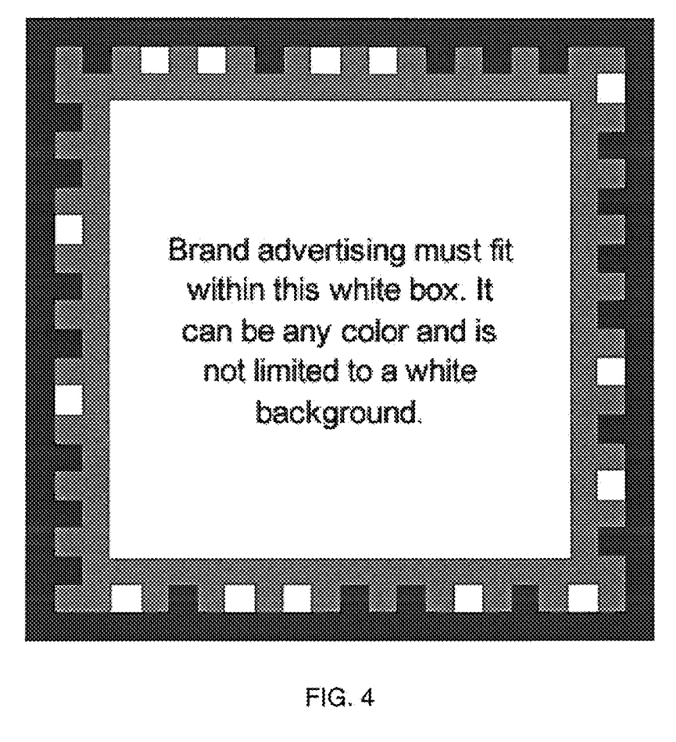
FIG. 4 provides an example of a Cypher Marker used with advertising.

Cypher Augmented Reality Systems (CARS)—In an alternative embodiment, the present invention may be used for displaying advertising material. The CARS Advertising Application allows advertisers to track and run up to 512 AR advertisements with a single mobile application. The advertisements can be of any nature previously described in this application. A Frame Marker must be used and printed at a reasonable size on the product's packaging. The Frame Marker may contain specific branded information within its borders. The unique id of a Frame Marker is encoded into a binary pattern along the border of the marker image. A user would point a camera at the packaging to introduce a similar AR presentation on the user's mobile or fixed device. See FIG. 4.

The implementation of the display portion of the present invention is initially achieved by the user installing the software in their device. Typically, to install the software, a user will place a disc into the DVD-ROM drive. If the computer is AutoPlay capable, an installation window will automatically pop up on the Windows desktop. The user will follow the on-screen instructions to install the program. After the application is successfully installed, a shortcut icon will be added to the Start menu and to the desktop.

Alternatively, the user may download the requisite files by using the internet, such as by using a known registration process, or may download files using other known techniques. The Flash Cards used in the present invention include encoded markers which are distinguishable by the software of the present invention. In the preferred embodiment, the markers are square and have a continuous border (generally full black). The markers sit on a background of contrasting color (pure white is preferred). The border thickness is preferably 25% of the length of an edge of the marker. The area inside the border, which is referred to as the marker image, must not be rotationally or linearly symmetric. The area inside the border should be black and white. The border may also be represented by a dotted line. However, the border is used merely to represent the suggested amount of white background on which the marker will sit. (See FIG. 2).

The user operates the invention by following the steps below:

Make sure the computer is connected to a video (web) camera.

Double-click the icon on the Windows desktop or in the Start menu.

The application will launch.

Choose the settings display settings.

A window with images of Cypher cards will pop up onscreen. Click on the card to see that image come to life. If the computer is connected to a webcam, the window should display live video once the user clicks on a card.

The user holds up the appropriate Cypher card so that the black square on the back directly faces the webcam. When held up properly, the 3D marker should be visible on the computer screen. Live 3D animation will pop up in the window. To "lock" the scene into place, quickly remove the card from in front of the webcam; to regain control of the scene, hold the marker up to the webcam again.

Because the area inside the border, which is referred to as the marker image, must not be rotationally or linearly symmetric, in the preferred embodiment the area inside the boundary is used to determine the rotation of the marker and presents specific information to the user via video feed dependent on rotation. Although the preferred embodiment is described here, variations and differences can also be used so long as there is a common encoding algorithm used by the cards and software.

The Virtual AR Marker System of the present invention (herein referred to as the "Virtual AR Marker System") is the 3D computer graphic representation system used to represent an actual marker. The Virtual AR Marker System includes a user controllable virtual 3D AR marker to control an AR scene such as mouse movements, similar to the way handheld AR Markers are used to control an AR scene with hand gestures. By providing an option to use a Virtual Marker, the system makes it easier for young children to interact with the augmented reality world. Instead of holding an AR marker with one hand, and interacting with images with the other hand, a keystroke, such as by typing the space bar on a keyboard, can be pressed to activate the Virtual Marker. The Virtual Marker can also be controlled with simple mouse movements. The user can still see the marker in the 3D scene (see FIG. 3A and FIG. 3B), and the scene still looks and feels like other AR experience.

The AR experience is dependent on an AR marker being viewable by the camera. Button presses and mouse movements are not required. However, in the preferred embodiment button presses (Spacebar) are used to cycle through animations in some AR experiences. In at least one embodiment, scene changes do require usage of the mouse. The user must select the appropriate button, viewable in the display to select a different AR experience to view. Sound is used at least in part to augment animations, provide narrative information, and for background ambience.

The present invention combines several aspects for creating a new product line of edutainment products. The AR experiences are dependent on AR libraries for marker tracking. The AR experience may further be combined with audible playback, such as through use of a multi-channel approach so that, for example, different languages may be used for playback. In the preferred embodiment, an ELAN eSL 16-bit DSP Sound Processor is used, although chips with equivalent capability may alternatively be used. The chip permits concurrent speech and melody playback. In the present invention, the sound can be used to control movement of the avatar.

Alternatively, a stylus or keystrokes may be used to integrate an audible learning system that, for example, may help children be quizzed, and the stylus may be used for selecting elements of the card or the display. In such a circumstance, the stylus's movement would be captured by the software, similarly to how the webcam captures movement. The stylus could serve the function of a reader of the book content. It can also trigger the 3D animation from the engine of the present invention.

It is also to be understood that the following claims are intended to cover all of the generic and specific features of the invention herein described, and all statements of the scope of the invention which, as a matter of language, might be said to fall therebetween.

The invention claimed is:

1. A system for concurrently displaying a live video feed in combination with a processor-identified entry, said entry replacing an object in said live video feed comprising:
   a video camera,
   a processor-controlled computer,
   a video display,
   a data library with entries including digital content and display instructions for displaying video, and
   a tracker to track the movement and orientation of an object in a field of vision of said video camera;
   wherein said video camera captures a live feed of content in its field of vision, delivers said content to said processor, said processor identifies said object and said object's movement and orientation in said field of vision, said processor generates a query to said data library for an entry corresponding to said object, said processor replaces said object in said live feed with said entry thereby creating a combined feed, said processor delivers said combined feed to said video display for presentation, and said processor receives input from said tracker and synchronizes any changes in movement or orientation of said object in said field of vision with corresponding changes of said entry in said combined feed.

2. The system of claim 1, wherein said content changes based on user input, where said input includes at least one of physical movement of the object or camera, a keystroke, multitouch, or audio.

3. The system of claim 1, wherein said processor identified entry appears as a three dimensional overlay.

4. The system of claim 1, wherein said combined feed appears on a mobile device.

5. The system of claim 1, wherein said replacement displays as a rotating image.

6. The system of claim 1, wherein the display of said processor identified entry includes an augmented reality effect.

7. The system of claim 6, wherein the augmented reality effect is adjusted based on the changing position or orientation of the object.

8. The system of claim 1, wherein the movement of the physical object in the live video feed is controlled by the viewer.

9. The system of claim 1, wherein said processor identified entry displays as a moving image.

10. The system of claim 1, wherein said processor identified entry displays as a rotating image.

* * * * *